June 14, 1966  G. P. BALFOUR  3,255,888
CONTINUOUS FILTERATION AND EXTRACTION APPARATUS
Filed Feb. 14, 1963  2 Sheets-Sheet 1
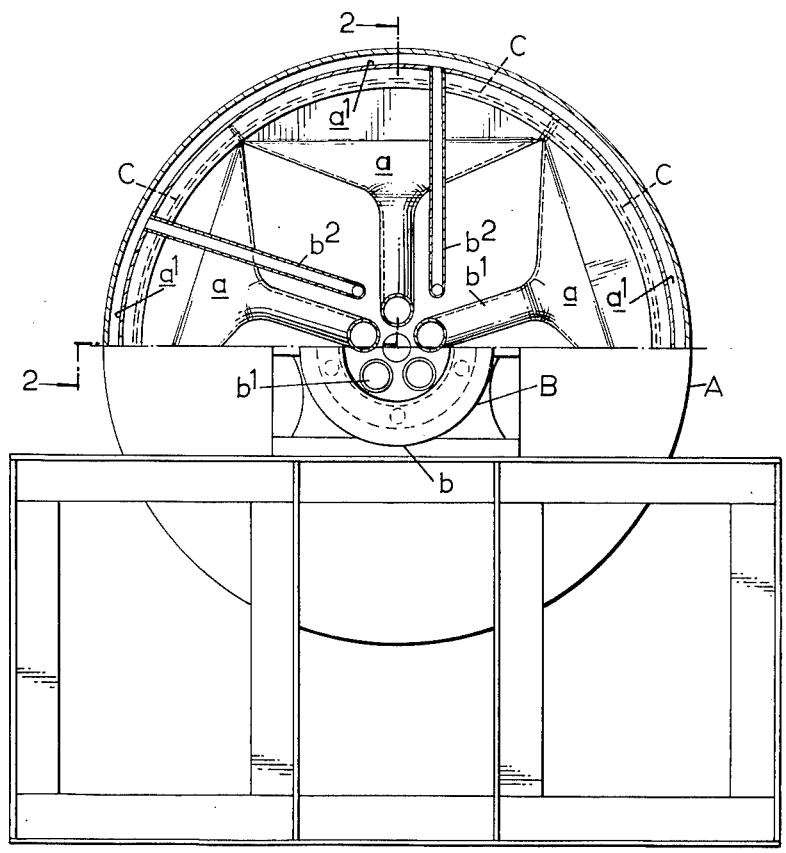
—FIG. 1.—
INVENTOR:
GERALD PETER BALFOUR

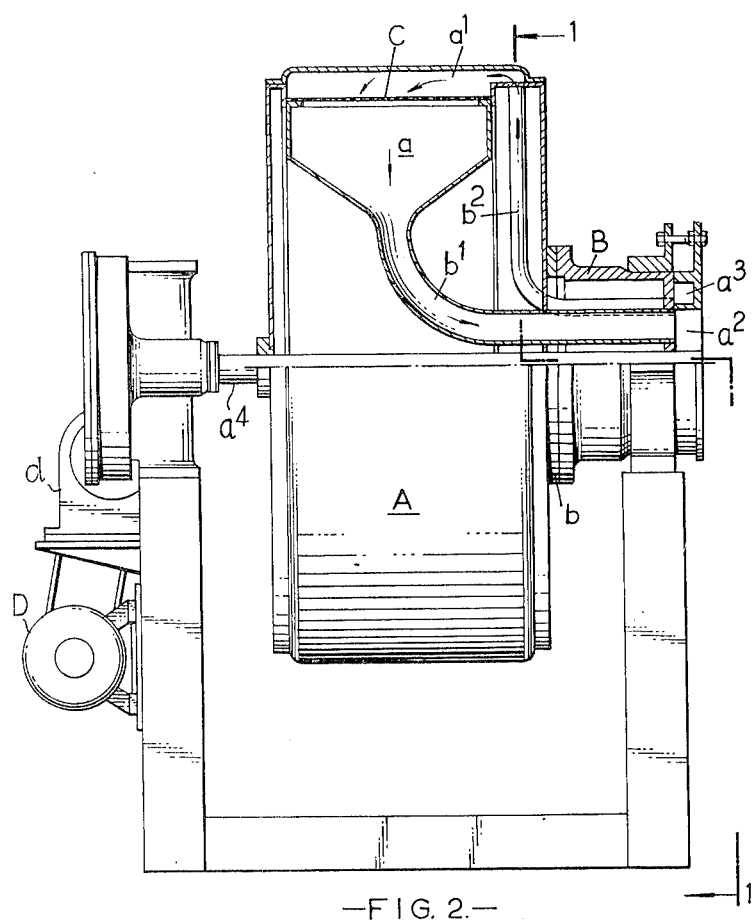
—FIG. 2.—

United States Patent Office 3,255,888
Patented June 14, 1966

3,255,888
CONTINUOUS FILTERATION AND EXTRACTION APPARATUS
Gerald P. Balfour, Wilmslow, England, assignor to Stockdale Engineering Limited, Poynton, Chester, England, a corporation of Great Britain
Filed Feb. 14, 1963, Ser. No. 258,544
3 Claims. (Cl. 210—330)

This invention relates to continuous rotary filtration and extraction apparatus.

According to the invention the apparatus comprises a plurality of chambers disposed around a central axis, the chambers being divided into two series separated by a filtration medium, with pipes connecting both series of chambers to a multiported valve mounted on the axis of the chambers.

The invention will be described with reference to the accompanying drawings:

FIG. 1 is an end elevation of the apparatus partly in section on line 1—1, FIG. 2 and FIG. 2 is a part sectional side elevation on line 2—2, FIG. 1.

The apparatus is shown in the form of a drum A closed at its ends and divided into two series of chambers $a$, $a^1$ at its periphery with a valve B mounted on the hub $b$ at one end, two rings of pipes $b^1$, $b^2$ being connected one from each series of chambers to ports $a^2$, $a^3$ in the valve.

The drum is mounted on a shaft $a^4$ and may be driven through gearing $d$ and a belt by a motor D.

In operation the material to be filtered is fed into one of the chambers $a^1$ on one side of the filtration medium C through which it passes from the valve B and the filtered liquid or gas passes back and out through the rotary valve. By relative rotation of the valve B the chambers $a$, $a^1$ are connected with other valve ports providing means for washing the filtered solids.

Further relative rotation connects the chambers to a source of flushing fluid which is fed to the opposite side of the filtration medium C to that on which the solids are retained in such a way as to dispatch the solids through the rotary valve B together with the flushing fluid.

The ports $a^2$, $a^3$ in the valve may be arranged so that a plurality of the chambers $a$, $a^1$ are simultaneously filtering and washing in convenient numbers. Alternatively, the filtered fluid from one chamber $a$ may be passed through the rotary valve B to the next chamber $a^1$ on one or other side in such a way as to produce a flow of fluid through a plurality of chambers in succession, thereby providing a means of counter current extraction of the solids by the fluid.

The chambers $a$, $a^1$ or the valve B may be rotated and the common axis may be horizontal or vertical as required.

I claim:

1. A continuous rotary filtration and extraction apparatus comprising a drum closed at its ends, a plurality of chambers disposed around the central axis of the drum, a filtration medium separating adjacent chambers to divide the chambers into two series, a multi-ported valve mounted on the axis of the drum, and pipes connecting both series of chambers to the multi-ported valve.

2. A continuous rotary filtration and extraction apparatus comprising a drum closed at its ends, a plurality of chambers disposed around the central axis of the drum, a filtration medium separating adjacent chambers to divide the chambers into two series, a multi-ported valve mounted on the axis of the drum, and pipes connecting series of chambers to the multi-ported valve and means for rotating the drum.

3. A continuous rotary filtration and extraction apparatus comprising a drum closed at its ends, a shaft on which the drum is mounted, a plurality of chambers disposed within the drum around the central axis thereof, a filtration medium separating adjacent chambers to divide the chambers into two series, a multi-ported valve mounted on the axis of the drum, a ring of pipes connecting one series of chambers to the valve and a second ring of a pipes connecting the other series of chambers to the valve and means for rotating the shaft.

References Cited by the Examiner
UNITED STATES PATENTS

| | | | |
|---|---|---|---|
| 872,616 | 12/1907 | Fairchild | 210—404 X |
| 1,213,866 | 1/1917 | Harding | 210—217 |
| 1,668,557 | 5/1928 | Grondal | 210—330 X |

REUBEN FRIEDMAN, Primary Examiner.